No. 660,255. Patented Oct. 23, 1900.
J. L. KINGMA.
MEANS FOR TEACHING SPEAKING AND READING.
(Application filed Jan. 31, 1899.)
(No Model.)
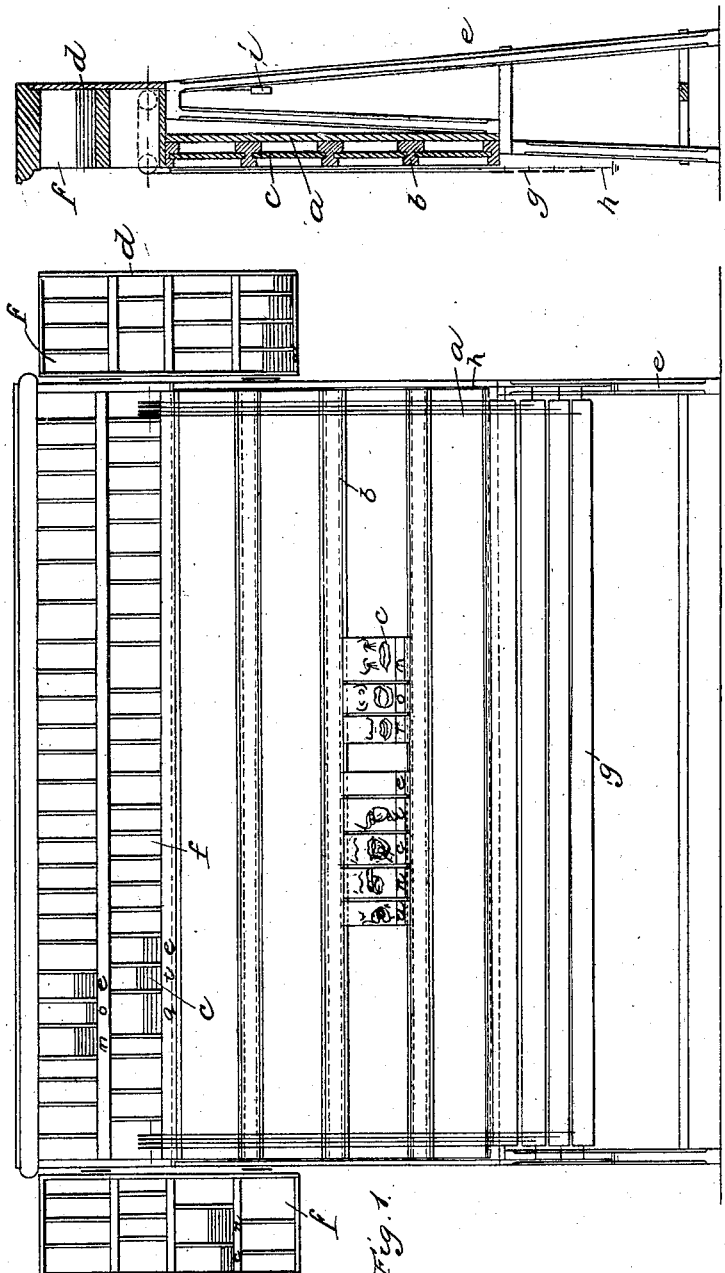
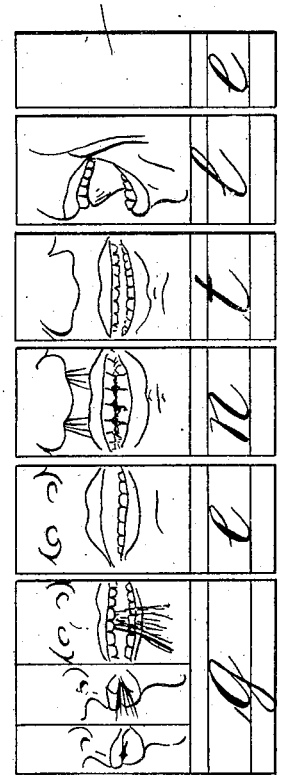
Attest:
Walter Donaldson
Edward L. Reed
Inventor
Jacobus Lambertus Kingma
by Richards & Co.
Attys.

UNITED STATES PATENT OFFICE.

JACOBUS LAMBERTUS KINGMA, OF AMSTERDAM, NETHERLANDS.

MEANS FOR TEACHING SPEAKING AND READING.

SPECIFICATION forming part of Letters Patent No. 660,255, dated October 23, 1900.

Application filed January 31, 1899. Serial No. 704,022. (No model.)

*To all whom it may concern:*

Be it known that I, JACOBUS LAMBERTUS KINGMA, gentleman, a subject of the Queen of the Netherlands, residing at 442 Weerengracht, Amsterdam, in the Kingdom of the Netherlands, have invented certain new and useful Means for Teaching Speaking and Reading, of which the following is a specification, reference being had to the accompanying drawings, in which—

Figure 1 is a front view of the stand or "blackboard" whereon are placed the boards or tablets hereinafter described. Fig. 2 is a transverse section through the said stand or blackboard. Fig. 3 shows some boards or tablets drawn to an enlarged scale.

This invention consists in a method and apparatus whereby the reading or speaking and correct pronunciation of a language can be learned in a short time.

In speaking one obtains the correct position of the mouth, and in learning to read one obtains through a series of positions of the mouth the idea of the words in question. For each letter in a word there is a position of the mouth. Single letters are formed by two or three different positions of the mouth. If one person wishes to teach another to read or speak a language, it is of the first importance that these positions of the mouth should be shown to the pupil. Heretofore it has been usual for the teacher to pronounce the letters and words clearly and ask his pupil to exactly consider the position of his mouth and tongue. The pupil must then pronounce the words after him. This method is a very laborious one both for the teacher and for the pupil. Moreover, the results of this method are altogether dependent on the capacity of the teacher and on the ability of the pupil, and with many pupils this method is not successful. Self-instruction is thus obviously out of the question. In my improved method this system is not used at all. Instead of the teacher, who pronounces the words first, there is a stand or blackboard whereon the words are shown by illustrating over each letter of the word the position or positions of the mouth belonging thereto. The duty of the teacher is thus limited to assisting the pupils during practice and to overhearing their reading. For this purpose the letters are covered and the sentence under study must be obtained or read from the positions of the mouth. Special talent is thus unnecessary, and for this reason my improved method can be universally employed both in school and at home, and it is especially suited for self-tuition.

The apparatus which is required in the employment of this method comprises:

First. A series of boards or tablets which have the letters painted on them in colors and above the letters the position of the mouth in pronouncing these letters. A letter is not always pronounced in the same manner, and this depends upon the adjacent letters. For this reason different boards or tablets are required for the same letter.

Second. A stand or blackboard whereon sentences can be formed by means of the said boards or tablets, and which must be provided with an arrangement whereby the letters painted on the boards or tablets can be covered so that only the positions of the mouth remain uncovered.

Third. A locker in which the boards or tablets can be stored in such a manner that in building up a sentence the required letter can be immediately picked out.

In the examples shown in the drawings the English language is dealt with. In Fig. 1 tablets forming the words "Uncle" and "Tom" are shown in place on the board, and in Fig. 3 are shown tablets forming the word "gentle."

On the stand or blackboard *a* are fixed five (or more) bars *b*. Between these bars *b* are placed the tablets *c*, and the arrangement is so designed that these tablets can be easily and rapidly inserted, adjusted, or removed. At the top and sides are arranged lockers *d*, which are subdivided into compartments or pigeonholes *f*. In these pigeonholes are stored the tablets, each letter having a pigeonhole for each manner in which it can be pronounced and this manner being clearly indicated beneath the pigeonhole. After some practice a sentence can be built up in a short time. The tablets are all of the same height. The breadths thereof are, however, different, this depending upon the number of positions of the mouth which are required for pronouncing the particular letter. The widths of the pigeonholes are also different to correspond. If a letter is not pronounced, it is consequently soundless—as, for example, the "e" in "Uncle." Thus no position of the mouth is indicated over this letter. The board $a$ is arranged on the supporting-frame $e$. Wood bars or strips $g$, which are guided on wires $h$, can be moved up and down and serve to cover the letters. The counterweights $i$ keep these bars or strips in equilibrium.

Fig. 3 shows clearly how the tablets are arranged, for example, for the word "gentle." It will be seen that for pronouncing the letter "g" in this word three positions of the mouth are required. The letter "n" in "gentle" is pronounced in a different way to the "n" in "Uncle," Fig. 1, and the position of the mouth is also different. The last "e" of "gentle" is again soundless. The pictures are colored and are prepared from photographs. Lips, nose, teeth, and tongue all take part in speaking, and their various positions are accordingly to be clearly shown. It is also clearly indicated if air issues from the nose or mouth in speaking.

The method which forms the subject of the present invention can be employed, first, in school, children being thereby thoroughly taught to read in a shorter time; second, in home instruction, and more especially in cases where for any reason a substitute must be found for school-teaching; third, in establishments for teaching deaf mutes to speak or to correct faults in speaking; fourth, in cases where attempts to teach a child to read by the methods heretofore generally employed have not been successful; fifth, for grown-up persons who wish to learn to read by self-tuition; sixth, for persons who desire to learn the correct pronunciation of a foreign language in a short time.

What I claim is—

1. The herein-described method of teaching the pronunciation of letters and words consisting in providing pictorial representations of the speaking-organs in the various positions corresponding to the various letters, and arranging said pictorial representations in various combinations, substantially as described.

2. An apparatus for teaching persons to speak and read, comprising a stand, bars fixed thereon, tablets arranged between said bars and on which are marked the letters and above them the positions assumed by the speaking-organs in pronouncing such letters, and movable strips or bars of wood by means of which the letters painted on said tablets can be concealed, substantially as hereinbefore described with reference to the accompanying drawings.

3. Means for teaching the art of speech comprising a plurality of tablets, said tablets having thereon pictorial representations of the positions of the mouth and other organs, said tablets being lettered to correspond with the character they represent, substantially as described.

In testimony whereof I have hereunto set my hand in presence of two subscribing witnesses.

JACOBUS LAMBERTUS KINGMA.

Witnesses:
THOMAS HERMANN VERHAVE,
AUGUST SIEGFRIED DOEER.